United States Patent

Spragg

[19]

[11] Patent Number: 6,118,529
[45] Date of Patent: Sep. 12, 2000

[54] MEASUREMENT OF SPECTROMETER BACKGROUND PROFILE

[75] Inventor: Richard Anthony Spragg, High Wycombe, United Kingdom

[73] Assignee: PerkinElmer International C.V., Switzerland

[21] Appl. No.: 09/383,240

[22] Filed: Aug. 26, 1999

[30] Foreign Application Priority Data

Aug. 28, 1998 [EP] European Pat. Off. ............. 98306958

[51] Int. Cl.[7] ...................................... G01J 3/02
[52] U.S. Cl. ............................ 356/307; 356/326
[58] Field of Search .................... 356/307, 326, 356/328; 250/252.1 A, 339.07, 339.08

[56] References Cited

U.S. PATENT DOCUMENTS 4,827,132  5/1989  Moscovitch ................. 250/337
5,291,426  3/1994  Collins et al. ................ 364/574

FOREIGN PATENT DOCUMENTS 0658751  6/1995  European Pat. Off. .
9207275  4/1992  WIPO .

*Primary Examiner*—F. L. Evans
*Attorney, Agent, or Firm*—St. Onge, Steward, Johnston & Reens LLC

[57] ABSTRACT

Background profiles for spectrometers are obtained by recording a number of background measurements over a period of time and analysing the measured data to create a statistical model of the instrument. The result is a set of stored background profiles with low noise level which are available when a sample measurement is made. The operator does not have to allow time to collect a background measurement as is the case in conventional techniques.

8 Claims, 2 Drawing Sheets

MEASUREMENT OF SPECTROMETER BACKGROUND PROFILE

FIELD OF THE INVENTION

This invention relates to spectrometers. The invention has particular, but not exclusive application to infrared spectrometers such as FT-IR spectrometers.

BACKGROUND ART

In for example an FT-IR spectrometer, infrared or near infrared radiation is directed from a source of such radiation towards a sample under investigation. Radiation transmitted by or reflected from the sample is received at a receiver and the output of the receiver is processed by a signal processor in order to obtain the spectral characteristics of the sample. In carrying out measurements it is first necessary to obtain background measurements, that is to say to measure the background spectrum without a sample in place at the sample station. Subsequently, measurements are made with the sample in place and the desired sample spectrum is obtained from the ratio of the measurement obtained with the sample in place to the background measurement. Conventionally background measurements are made at times which are very close to the time of the sample measurement in order to avoid any effects from instrument drift. The frequency of new background measurements depends on the stability of the spectrometer and the accuracy required. Also, because there is noise associated with the background measurement equal measurement times are usually used for both the sample and background measurements. As will be known to those skilled in the art during such measurement times it is the practice to carry out multiple scans which are then averaged in order to reduce the effects of noise. This procedure adds to the time necessary in order to obtain a sample spectrum.

SUMMARY OF THE INVENTION

The present invention is concerned with a technique which can result in a reduction in the time requires to obtain sample spectra.

According to one aspect of the present invention there is provided a spectrometer of the single beam type, which is arranged to measure the spectrum of a sample by comparing a background spectrum obtained without a sample present with a spectrum obtained with the sample present, said spectrometer including a source of analysing radiation, means for receiving radiation transmitted through or reflected from a sample station, and processing means for processing signals from the receiving means to provide spectral data, wherein the processing means is arranged so that it can record a plurality of background spectral profiles over a period of time and to analyse statistically said profiles in order to generate background profiles based on said collected background data. The statistical analysis may include a data reduction technique arranged to extract principal components from the recorded profiles. The statistical analysis can also include the step of reconstructing the original profiles from the data reduction step so as to create background profiles with lower noise levels. The reconstruction step can include constructing the best fit combinations of the extracted factors in the reduced data.

A spectrometer incorporating the present facility can be operated in a mode where the background profile is measured continuously when no sample is present. When it is required to obtain a sample measurement the background profile is in effect readily available since it can be predicted from the most recently collected background data. Thus the instrument has the current background stored in memory and that background has a relatively low noise level in view of the analysis which has been carried out on the background data. Thus, a sample measurement can be undertaken without having to incur time to make the background measurement as has been necessary in conventional techniques.

Typically the spectrometer will be an infrared spectrometer such as an FT-IR spectrometer.

According to another aspect of the present invention there is provided a method of operating a spectrometer of the single beam type in which a measurement of the spectrum of a sample is obtained by comparing a background spectrum obtained without a sample present with a spectrum obtained with the sample present, the method comprising the steps of recording a plurality of background profiles over a period of time, and analysing statistically those profiles in generate a reconstructed background profiles based on the collected background data.

BRIEF DESCRIPTION OF THE DRAWINGS

The invention will be described now by way of example only, with particular reference to the accompanying drawings. In the drawings.

DETAILED DESCRIPTION OF THE PREFERRED EMBODIMENT

Figure 1:
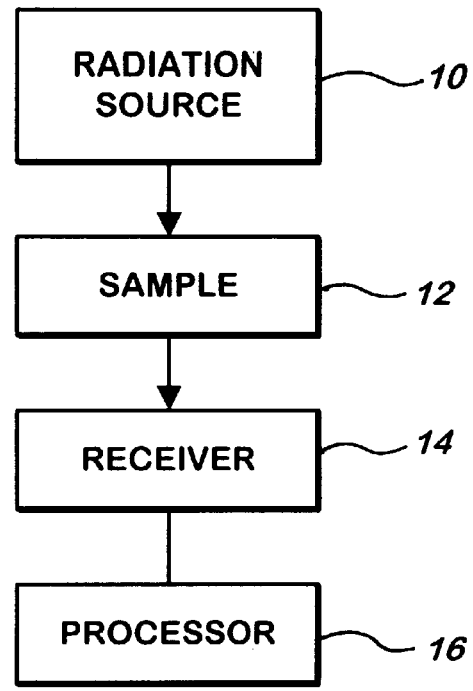
FIG. 1 is a block schematic illustration of an infrared spectrometer.

Referring to FIG. 1 of the drawings, an infrared spectrometer of the single beam type such as an FT-IT spectrometer in very general terms comprises a source of analysing radiation 10 which is arranged to direct analysing radiation to a sample station 12. Radiation from the sample station 12 is received at a detector or receiver 14 and the output of the receiver is processed by a processor 16 to provide data representative of the spectrum of a sample under investigation. As will be apparent to those skilled in the art in order to obtain measurements of the sample spectrum it is first necessary to obtain a background measurement, that is say without a sample present and then to carry out similar measurements with the sample present in order to obtain the desired spectrum of the sample by obtaining the ratio of the measurement in the presence of the sample and that without the sample present. The present description is concerned particularly with obtaining the background measurement.

It is known that the shape of the background profile of a spectrometer can change over time, because of drift in various components of the spectrometer. For example in an FT-IR spectrometer significant contributions to such changes can arise from the alignment of the interferometer and the temperatures of the source and the detector. Over relatively short periods of time, a week for example, these changes appear as fluctuations rather than as a monotonic drift. Thus the background profile at any time can be expected to lie within the range of profiles encountered previously.

The present embodiment operates in effect to develop a statistical model of the instrument so that background measurement are readily available. The first step in developing the model is to record a number of background profiles over a period of time. This will be carried out typically over a period of time when no sample measurements are being made. From these profiles a data reduction technique operated by the processor extracts principal components or factors corresponding to different sources of variation. This is a known technique and one such data reduction technique which can be employed is a principal components analysis (PCA). The originally obtained profiles are combination of the principal components or factors and some of the factors simply account for noise in the original data and can be discarded by the data reduction technique to thereby reduce the noise components.

The next step in the process is to reconstruct the original profiles with lower noise levels by obtaining the best fit combinations of the remaining factors, that is to say the factors that have not been discarded. The reduction in noise which can be achieved by such a process is approximately $\{(\text{number of profiles used in model})/\text{number of factors})^{1/2}\}$. The result is one or more reconstructed profiles having a reduced noise level. The extent of noise reduction in the reconstructed profiles can be varied according to the number of profiles used in the model. If a greater degree of noise level reduction is required, this can be achieved by increasing the number of profiles used. In practice the number can be several hundred. The noise can also be reduced by averaging multiple scans when recording the profiles used to create the model.

Figure 2:
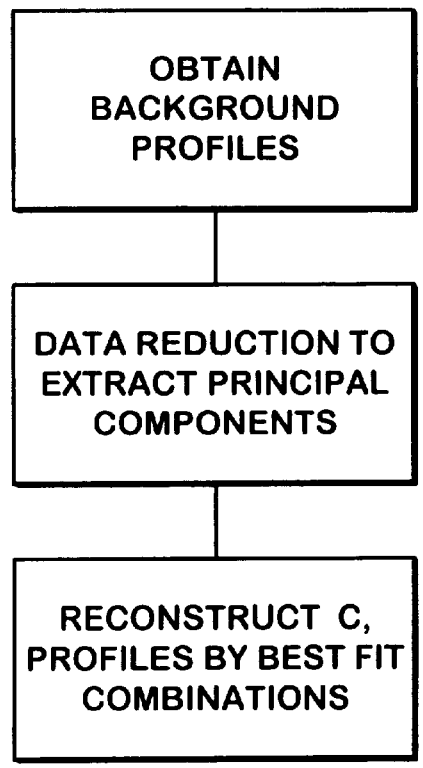
FIG. 2 is a flowchart illustrating the sequence of steps carried out by the processor of the spectrometer.

The steps carried out above are operated under software control by the processor and are summarised in the flowchart shown in FIG. 2 of the drawings.

Thus a spectrometer which is provided with a facility of the type described above can be operated in the mode where the background profile is measured continuously when no sample is present. When a sample measurement is required the background profile can effectively be predicted from the most recently collected background data. Thus the instrument is able to effectively provide the current stored background profile with a relatively low noise level without the operator having to allow time to collect the background profile. All that is required is to carry out the measurements with the sample in place. This can represent a significant time saving over conventional arrangements.

It should be appreciated that the model described above can be applied to a newly generated profile provided that the profile lies within the range of those used to generate the model. In such a case the specific combination of factors represents a prediction rather than a reconstruction. The new background profile can be measured with a single scan as high frequency noise is not reproduced by the model.

Figure 3A:
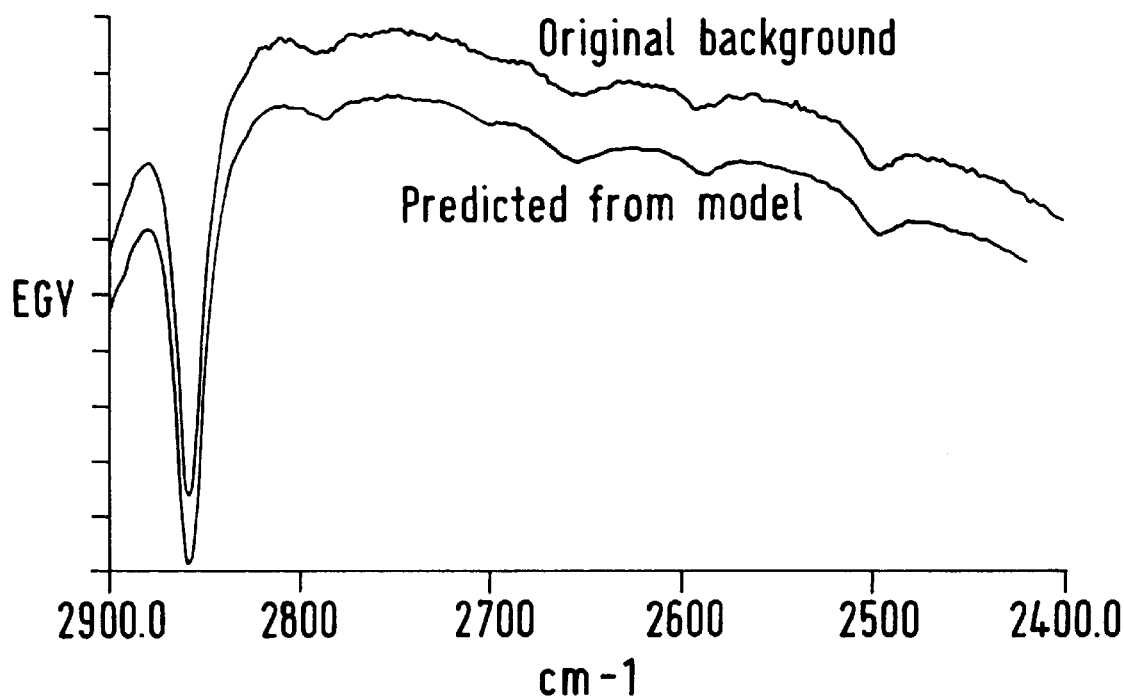
FIGS. 3A and 3B are graphs illustrating the present invention.

As an example a PCA type technique has been used in conjunction with a Perkin-Elmer Paragon 1000 spectrometer. The PCA model was constructed using 22 separate background scans from the Paragon instrument. The model contained only two factors. The model was used to predict a background profile from a single scan measurement on the same spectrometer, but outside the time period of the scans used for the model. The profiles obtained from the model are shown in FIG. 3A. The reduction in noise can be seen by comparing the original background with that predicted from the model.

Figure 3B:
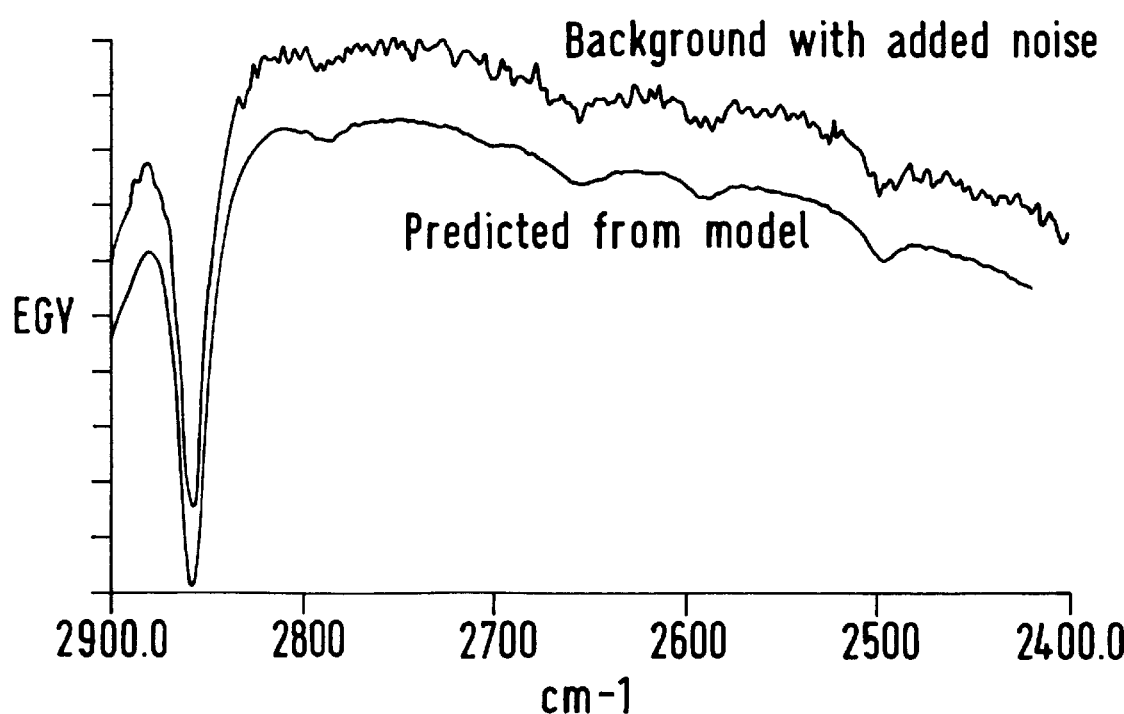

As a further test noise was added to the same background scan and the profile was again predicted. This predicted background has a similar noise level to that predicted from the background without added noise as can be seen from a comparison the two curves of FIG. 3B.

A further advantage of the present technique is that the diagnostic tools associated with the prediction, such as Mahalanobis distance and residual ratio, indicate whether a newly measured background profile lies within the range of the model. Thus the instrument model can be automatically updated when long term drift makes this necessary.

It will be appreciated accessories such as Attenuated Total Reflectance accessories can be used with spectrometers in order to carry out measurements on samples. Each such accessory has its own background profile and thus it will be necessary to record a background profile for each accessory.

What is claimed is:

1. A spectrometer, which is arranged to measure the spectrum of a sample by comparing a background spectrum obtained without a sample present with a spectrum obtained with the sample present, said spectrometer including a source of analysing radiation, means for receiving radiation transmitted through or reflected from a sample station, and processing means for processing signals from the receiving means to provide spectral data, wherein the processing means is arranged so that it can record a plurality of background spectral profiles over a period of time and to analyse statistically said profiles in order to generate background profiles based on said collected background data.

2. A spectrometer according to claim 1, wherein the statistical analysis includes a data reduction technique arranged to extract principal components from the recorded profiles.

3. A spectrometer according to claim 2, wherein the statistical analysis can also include the step of reconstructing the original profiles from the data reduction step so as to create background profiles with lower noise levels.

4. A spectrometer according to claim 3, wherein the reconstruction step includes constructing the best fit combinations of the remaining factors in the reduced data.

5. A method of operating a spectrometer in which a measurement of the spectrum of a sample is obtained by comparing a background spectrum obtained without a sample present with a spectrum obtained with the sample present, the method comprising the steps of recording a plurality of background profiles over a period of time, and analysing statistically those profiles in generate a reconstructed background profiles based on the collected background data.

6. A method according to claim 5 including a data reducing step for extracting principal components from the recorded profiles.

7. A method according to claim 6 including the step of reconstructing the original profiles from the data reduction step so as to create background profiles with lower noise levels.

8. A method according to claim 7, wherein the reconstruction step includes constructing the best fit combinations of the remaining factors in the reduced data.

* * * * *